March 2, 1954 — W. M. HEINA — 2,670,569
EYE FOR MANNEQUINS AND DOLLS
Filed June 5, 1951
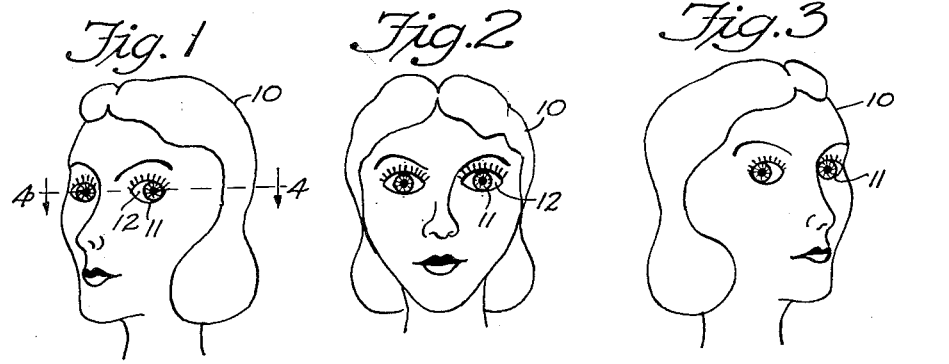
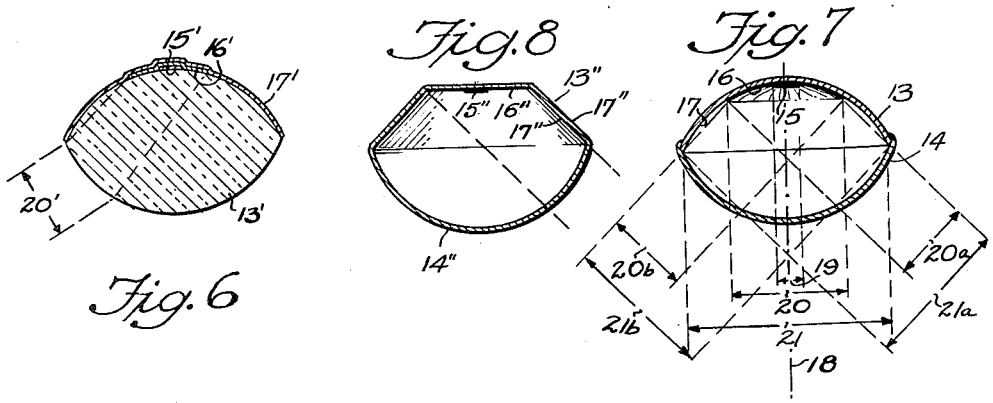
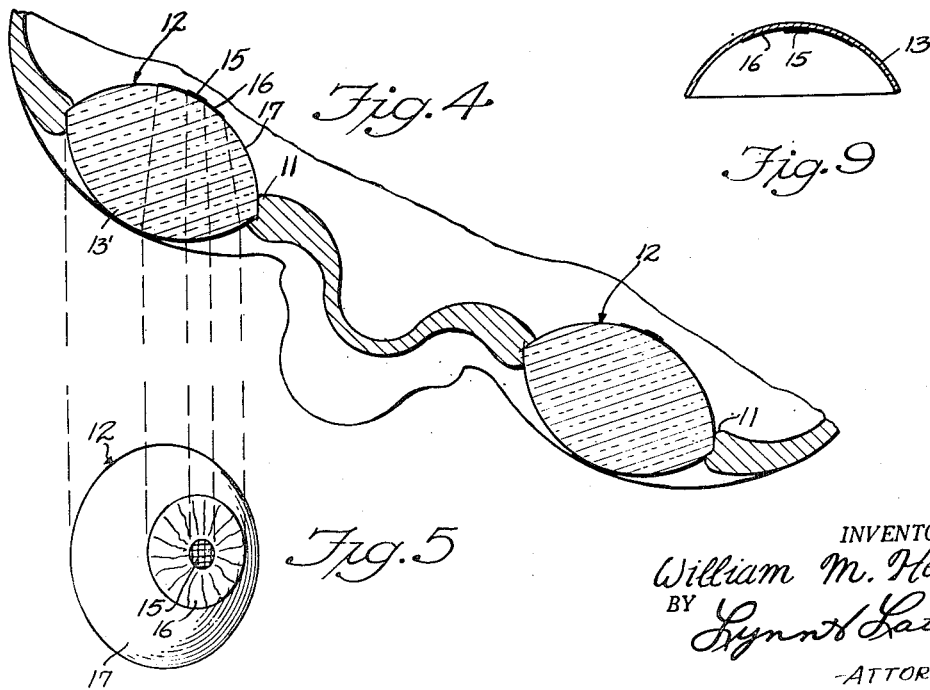
INVENTOR.
William M. Heina
BY Lynn Latta
-ATTORNEY- Patented Mar. 2, 1954

2,670,569

UNITED STATES PATENT OFFICE 2,670,569

EYE FOR MANNEQUINS AND DOLLS

William M. Heina, Santa Monica, Calif.

Application June 5, 1951, Serial No. 230,031

2 Claims. (Cl. 46—165)

This invention relates to dolls, mannequins, and the like, and has as its general object to provide, for such an article eyes which, when viewed from various angles within a wide range, will appear to always be looking directly at the observer. The invention is applicable to dolls, mannequins, or to display devices embodying a human face (e. g. a signboard).

More specifically, the invention has as its object to provide an eye of extremely simple and inexpensive construction, having no moving parts, adapted to be mounted fixedly in the eye socket of a mannequin or doll and to provide the above mentioned illusion of always looking directly at the observer.

Other objects will become apparent in the ensuing specification and appended drawings in which:

Fig. 1 is a front view of the head of a mannequin embodying the invention, viewed in approximately one third left profile;

Fig. 2 is a front view of the same;

Fig. 3 is a front view of the same viewed in approximately one third right profile;

Fig. 4 is a sectional view thereof taken on the line 4—4 of Fig. 1;

Fig. 5 is a front view of one of the eyes as seen in projection from Fig. 4;

Fig. 6 is a detail sectional view of one of the eyes, illustrating approximately a 120° range of viewing thereof with the iris fully visible;

Fig. 7 is a sectional view of a modified form of the invention, embodying a range of viewing of about 90°;

Fig. 8 is a sectional view of another modified form of the invention, and

Fig. 9 is a sectional view of another modified form of the invention.

Referring now to the drawings in detail, I have shown in Figs. 1-4 a mannequin's head 10 of hollow construction, which may be of any conventional material such as papier-mâché, with a contour representing a stylized reproduction of a human face, and having eye sockets which are indicated at 11.

Fixedly mounted in sockets 11 are the eyes of my invention, indicated generally by the numeral 12. Each of the eyes 12 comprises a transparent body shaped somewhat like a thick lens, either solid or hollow. The solid form, shown in Figs. 4–6, is rendered opaque on its rear surface with colored pupil, iris and eye white applied thereon. The hollow form, shown in Fig. 7 can be one fabricated as an integral shell or in two sections, secured together. In either case the rear of the hollow shell is rendered opaque as mentioned above, either on the back or front of the rear member.

In the solid eye of Fig. 6, the areas 15', 16', 17' are applied to the rear surface externally, as shown, and are viewed through the transparent body of the eye.

Fig. 7 illustrates the embodiment of the invention in a sectional shell including a dished rear section 13 of opaque material (or of opaque inner surface finish) and a transparent front window section 14 covering the open front thereof. Displayed upon the inner wall of shell 13, in a position concentric with the axis thereof, are a relatively large circular spot 16 representing an iris, and a relatively small circular spot 15 representing an eye pupil. Both spots overly a white background coating 17 covering the remainder of the inner wall of shell 13, and representing the "white" of an eyeball. Spot 15 is black to correspond to the black color of an eye pupil. Spot 16 may be colored blue, green, hazel or brown to correspond to the various colors of eye irises in human beings, and has imprinted thereon a series of radial lines as shown in Fig. 5, depicting the corresponding lines in an eye iris.

Window 14 is fully transparent so that whitened wall 17, iris 16 and pupil 15 may be as fully visible as though actually occurring on the forward face of window 14 as they occur on an eyeball. At the same time, window 14 reflects sufficient light to give the glassy or shiny appearance of the moist eye ball in a human being. The window 14 may be constructed from thin transparent sheet material (e. g. transparent plastic sheet) having no noticeable effect on the direction of light rays passing therethrough (no less action or other action tending to bend the light rays or to render them non-parallel).

The invention is characterized by the fact that the iris 16, and "white" 17 are imprinted upon a concave surface of sufficient depth or concavity to provide for an apparent shifting of the iris 16 and pupil 15 from an exactly centered position as viewed along the axis 18 (Fig. 7) of the eye, i. e. as viewed directly from the front; to positions of considerable eccentricity as viewed from one side or the other. This eccentricity results from a shifting or crowding of the lines of sight (indicated at 19 and 20 respectively for the axial viewpoint) which embrace respectively the pupil 15 and iris 16, with reference to the entire band of sight (indicated at 21 for the axial viewpoint), which embraces the full diameter of "white" 17, defined within the rim thereof, as the viewpoint shifts from the coaxial position toward the right or left extremity of the viewing range. At the right extremity of the viewing range, it will be noted that the right extremity of the sight band embracing the iris (here indicated at 20a) has become coincident with the right side of the full band 21a. In a case where the viewer might change elevation while passing the mannequin, there would be a corresponding vertical shift of the apparent position of the pupils of the eyes. Consequently, the irises of the two eyes as viewed from the right extremity of the sight range (as in Fig. 1) will appear to meet the right extremities of the eye openings. Similarly, at the left extremity of the viewing range, the two irises (Fig. 3) will appear to meet the left extremities of the eye openings, the iris sight band, indicated at 20b in Fig. 7, being coincident at the left margin thereof with the left margin of the entire band 21b.

The invention is particularly useful in connection with mannequins which are displayed in store windows. By placing such a mannequin in a position directly facing the store window, with the axes of the eyes at right angles to the sidewalk, a person preceeding along the sidewalk and looking at the mannequin will gain the impression that the eyes of the mannequin follow the person throughout the entire range of travel past the window. Figs. 1, 2 and 3 illustrate how the eyes of the mannequin will appear to a person proceeding from the right to the left past the mannequin, looking toward the mannequin. Fig. 1 illustrates the mannequin as it appears near the right extremity of the viewing range; Fig. 2 illustrates the mannequin as it appears from directly in front, and Fig. 3 illustrates the mannequin as it appears after the viewer has passed the mannequin and reached the left extremity of the viewing range. By looking at the three figures in succession beginning with Fig. 1, it will be apparent how the eyes of the mannequin tend to follow the observer as he thus proceeds past the mannequin. The invention may also be applied to other display devices, such as advertising signs (e. g. a signboard embodying a human face).

When used in a mannequin the invention has the advantage of creating interest and drawing the attention of a passerby, to the mannequin.

The eye (Fig. 6) as molded in the form of a solid body of glass or plastic with the opaque surfaces 15', 16', 17' applied on the rear surface thereof and viewed through the solid transparent glass or plastic body, may have some degree of light refraction (as indicated by the bending of lines 20' in Fig. 6). Such refractive characteristics will obviously depend on the material used, and are compensated for by appropriate modification of the contour (depth) of the rear surface of the eye, and of the dimensions of areas 15', 16'. For example, any magnifying effect attained in the transparent, solid lens-form eye, may be correlated with the pupil and iris areas 15', 16' of somewhat smaller diameter than in the hollow eye of Fig. 7, and the depth of the rear portion (rearwardly of the rim) of the eye, may be somewhat greater than in the hollow form, for equivalent results, the bending of the light rays tending to widen the angular range of effectiveness. Alternatively, where the same rear curvature is utilized as in the hollow form, the refractive effect may be utilized to obtain a wider angular range of effectiveness.

The included angle between the bands 20a and 20b of the respective limits of the viewing range may approximate 120°, which is the maximum within which the invention may be satisfactorily embraced. The optimum condition is that wherein the included angle between the band 20a, 20b is in the neighborhood of 90°.

Fig. 8 illustrates how the shell 13", instead of being of substantially uniform double curvature as in Figs. 6 and 7, may include a conical portion 17" the inner wall of which is painted white to represent the white of the eye, and a flat circular disc shaped iris portion 16", the inner wall of which is finished to simulate an iris and is provided with a central disc 15" superimposed thereon to represent the pupil of the eye. The window 14" covers the open side of the shell.

Fig. 9 illustrates how the shell 13 may have an open front, uncovered by any window or other covering. This form of the invention will function in the same manner as the previously described forms, insofar as the apparent shift of the iris and pupil from one side to the other is concerned, but does not have the advantages of being covered by a transparent window which excludes dust and dirt from the inner wall of the shell and also provides a shiny convex surface for heightening the similarity to the appearance of a human eye.

It is to be noted that an essential characteristic of the invention is the location of the entire area of pupil and iris considerably below the plane of the rim of the eye body (whether hollow or solid) so that the apparent shift of the pupil and iris may shift relative to said rim.

I claim:

1. An eye for mannequin, dolls and the like, comprising a self-contained, prefabricated part having approximately the form of an oblate spheroid and including respective front and rear walls each having a shape corresponding to somewhat less than half the surface of a sphere, said walls having external surfaces that are convex, and being arranged on an axis which constitutes a common radius of both of said surfaces, said external surface of said front being transparent, yet smooth, polished and light reflecting so as to simulate the forward surface of a natural eye, and said walls intersecting to define a circular periphery in the form of a peripheral edge of angular cross section such as to provide for mounting of the eye in an eye socket with a relatively small percentage of the peripheral portion of the eye being embedded in said socket; said body being transparent with the exception of said rear wall which is opaque and has a forward surface which is finished to simulate, at the center thereof, an eye pupil and an annular iris surrounding said pupil and which has an annular surface defined between said iris and said peripheral edge which annular surface is white to simulate the white of an eye, the arcuate extent of each of said walls, between diametrically opposed points in said edge, being in the neighborhood of three quarters of a semi-circle, whereby said pupil and iris are disposed at such a depth below the plane of said peripheral edge, considered as defining the margin of said eye white, that the position of said pupil and iris in the entire band of sight embracing the full diameter of said eye white will shift through an included angle of approximately 120°, from one side of the margin of said eye white to the opposite side thereof as the viewer moves past the eye in a direction transversely of the axis thereof, whereby to give the impression of the eye moving to follow the observer.

2. An eye as defined in claim 1, constituted of a clear transparent solid body of molded plastic material having integral convex forward and rear surfaces and wherein said rear wall comprises a plurality of layers of opaque material adhering to said rear surface of said plastic body, with said eye pupil constituting an inner layer, said iris constituting an intermediate layer laid over said pupil, and said eye white constituting an outer layer laid over said iris layer and having an annular outer portion directly adhering to said convex rear surface of said body.

WILLIAM M. HEINA.

References Cited in the file of this patent

UNITED STATES PATENTS

| Number | Name | Date |
|---|---|---|
| 2,295,890 | Conrad | Sept. 15, 1942 |
| 2,399,121 | Janson | Apr. 23, 1946 |
| 2,601,107 | Ellett | June 17, 1952 |

FOREIGN PATENTS

| Number | Country | Date |
|---|---|---|
| 493,080 | Germany | Mar. 1, 1930 |
| 458,328 | Great Britain | Dec. 17, 1936 |
| 567,949 | Great Britain | Mar. 9, 1945 |